United States Patent Office 3,546,261
Patented Dec. 8, 1970

3,546,261
NOVEL ETHOXYLATED ACETIC ACID ESTERS OF PREGNANE-21-OLS
André Allais, Les Lilas, and Michel Paturet, Sucy-en-Brie, France, assignors to Roussel-UCLAF, Paris, France, a corporation of France
No Drawing. Continuation of application Ser. No. 770,889, Oct. 15, 1968, which is a continuation of application Ser. No. 649,354, June 27, 1967, which in turn is a continuation of application Ser. No. 499,050, Oct. 20, 1965. This application Nov. 26, 1969, Ser. No. 873,745
Int. Cl. C07c *169/32*
U.S. Cl. 260—397.45                4 Claims

ABSTRACT OF THE DISCLOSURE

Esters of pregnane-21-ols of the formula

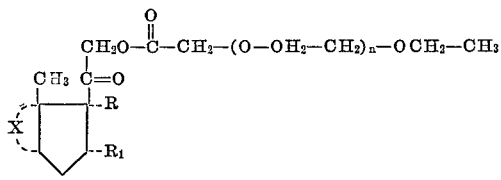

wherein R is selected from the group consisting of hydrogen, hydroxy and OAc, Ac is an acyl radical of an organic carboxylic acid having 1 to 7 carbon atoms, $R_1$ is selected from the group consisting of hydrogen and lower alkyl of 1 to 7 carbon atoms, $n$ is an integer from 1 to 2 and X represents the A, B and C rings of a pregnane steroid and to novel intermediates therefor. The invention also relates to a novel process for the preparation of the said novel steroid esters. The invention also relates to novel anti-inflammatory compositions and to a novel method of reducing inflammation.

This application is a continuation of S.N. 770,889, filed Oct. 15, 1968, which is a continuation of S.N. 649,354, filed June 27, 1967, which is a continuation of S.N. 499,050, filed Oct. 20, 1965, now all abandoned.

The novel esters of Formula I have interesting pharmacodynamic properties and particularly anti-inflammatory and anti-pruriginous activity by percutaneous administration. They are useful for the treatment of inflammatory ailments, of infectious dermatosis, of pruritus, of eczema and of ulcerated wounds.

The esters of Formula I have the advantage of being water-insoluble while known 21-esters of pregnane compounds such as those disclosed in German Pat. No. 1,156,075 are water-soluble. Their water-insolubility prevents too rapid diffusion or passage of the compounds through the skin and, therefore, the activity of the compounds of Formula I is perceived essentially on the level of the skin, whereas the water-soluble esters of the said German patent display an activity as by general administration and, therefore, cause undesired secondary effects in hormono therapy.

In the case of esters of cortisonic derivatives, side effects caused by the general activity of the cortisonic derivatives are avoided. Therefore, the phenomena of emaciation, of decalcification, or the danger of stimulating a gastric ulcer peculair to corticotherapy are prevented from appearing. In the case of esters of estrogens, side effects caused by the general activity of the estrogens are avoided and the apperance of mastopathies and of phenomenas of feminization peculair to estrogen therapy are prevented. The water-insoluble esters of Formula I only have an effect on external wounds responsive to local medication.

OBJECTS OF THE INVENTION

It is an object of the invention to provide the novel esters of pregnane-21-ols of Formula I.

It is another object of the invention to provide novel intermediates for the esters of pregnane-21-ols of Formula I.

It is a further object of the invention to provide a novel process for the preparation of the esters of pregnane-21-ols of Formula I.

It is an additional object of the invention to provide therapeutic novel compositions containing the esters of pregnane-21-ols of Formula I as the active ingredient.

It is another object of the invention to provide a novel method of treating external wounds of warm-blooded animals without undesriable side effects.

These and other objects and advantages of the invention will become obvious from the following detailed description.

THE INVENTION

The novel esters of pregnane-21-ols of the invention have the formula

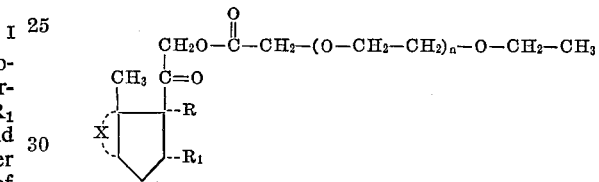

wherein R is selected from the group consisting of hydrogen, hydroxy and OAc, $R_1$ is selected from the group consisting of hydrogen and lower alkyl, Ac is the acyl radical of an organic carboxylic acid having 1 to 7 carbon atoms, $n$ is an integer from 1 to 2 and X represents the A, B and C rings of a pregnane steroid. The A, B and C rings of a pregnane steroid may be saturated or possess 1 to 3 double bonds and may be substituted with halogen, hydroxy, keto and/or lower alkyl groups.

Examples of suitable pregnane compounds which can be used to form the novel esters are 9α-fluoro-16α-methyl-$\Delta^{1,4}$ - pregnadiene - 11β,17α,21 - triol-3,20-dione, prednisolone, predisone, cortisone, hydrocortisone, 9α-fluoroprednisolone, 6α - methyl - $\Delta^{1,4}$ - pregnadiene-11β,17α,21-triol-3,20-dione, etc.

The process of the invention for the preparation of the esters of pregnane-21-ols of Formula I comprises reacting a pregnane-21-ol of the formula

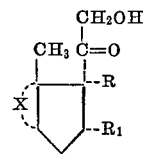

II wherein R, $R_1$ and X have the above definition with an esterifying agent of an acid having the formula

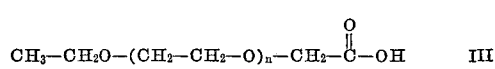

III wherein $n$ has the above definition and recovering the said ester. The esterifying agent of the acid of Formula III may be the free acid or its anhydride or acid halide. The reaction is preferably performed in an organic solvent in the presence of a tertiary amine such as pyridine.

The novel therapeutic compositions of the invention are comprised of an effective amount of at least one ester of pregnane-21-ols of the formula

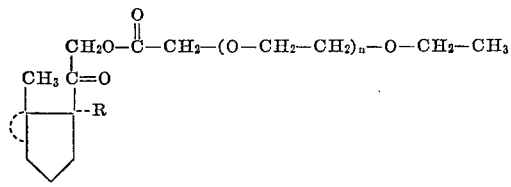

wherein R is selected from the group consisting of hydrogen, hydroxy and OAc, $R_1$ is selected from the group consisting of hydrogen and lower alkyl, Ac is the acyl radical of an organic carboxylic acid having 1 to 7 carbon atoms, $n$ is an integer from 1 to 2 and X represents the A, B and C rings of a pregnane steroid, and a major amount of a topical pharmaceutical carrier. The preferred concentration of the active compound is 0.01% to 1%. The said compositions can be prepared in the form of vaginal jellies. ointments, creams and jellies by the usual methods.

The novel method of the invention of treating external wounds of warm-blooded animals without undesirable homonal side effects comprises applying to the said wounds an effective amount of at least one ester of pregnane-21-ols of the formula

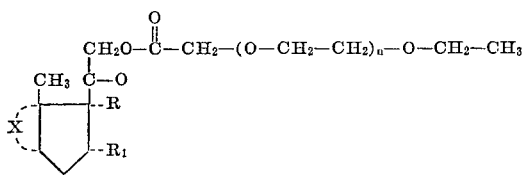

wherein R is selected from the group consisting of hydrogen, hydroxy and OAc, $R_1$ is selected from the group consisting of hydrogen and lower alkyl, Ac is the acyl radical of an organic carboxylic acid having 1 to 7 carbon atoms, $n$ is an integer from 1 to 2 and X represents the A, B and C rings of a pregnane steroid. The said compounds are applied topically to the skin and mucous membranes.

In the following examples there are described several preferred embodiments to illustrate the invention. However, it should be understood that the invention is not intended to be limited to the specific embodiments.

EXAMPLE 1

Preparation of 21($\beta$-ethoxy-$\beta$-ethoxyethoxy)-acetate of 9$\alpha$-fluoro-16$\alpha$-methyl - $\Delta^{1,4}$ - pregnadiene - 11$\beta$,17$\alpha$,21-triol-3,20-dione Step A.—Preparation of ($\beta$-ethoxy-$\beta$-ethoxyethoxy)-acetic acid: 11.5 gm. of sodium were introduced into 100 cc. of monoethyl ether of diethyleneglycol and the mixture was heated at an internal temperature of 150° C. for several hours while stirring under an atmosphere of nitrogen until the sodium was completely dissolved. After cooling, 200 cc. of benzene were added to the reaction mixture and then 66.5 gm. of anhydrous potassium monochloroacetate were added thereto in small fractions and the reaction mixture was heated at reflux for 3 hours with vigorous agitation. Then the mixture was cooled, diluted with water and acidified by addition of concentrated hydrochloric acid. Next, the benzene phase was decanted and the aqueous phase was extracted with benzene. The combined organic phases were dried and concentrated to a low volume under vacuum. Thereafter, the residual liquid was rectified under vacuum and the fraction distilling at 138–142° C. under vacuum of 0.5 mm. Hg was recovered.

The liquid obtained was dissolved in ethyl acetate at room temperature and the resulting solution was saturated with a stream of dimethylamine to destroy excess chloroacetic acid and finally the solution was evaporated under vacuum. The residue was taken up in water and the resulting solution was acidified by addition of hydrochloric acid and extracted with methylene chloride. The organic phase was recovered and dried and the solvent was removed. The residue was rectified under vacuum to obtain 22.7 gm. of ($\beta$-ethoxy-$\beta$-ethoxyethoxy)-acetic acid having a boiling point of 140–142° C. at 0.5 mm. Hg and a specific rotation of $n_D^{20} = 1.446$. The product was soluble in water, dilute aqueous alkalis and in most of the common organic solvents.

Analysis.—Calc'd for $C_8H_{16}O_5$ (percent): C, 49.99; H, 8.39. Found (percent): C, 50.3; H, 8.5. Molecular weight=192.21.

This compound is not described in the literature.

Step B.—Preparation of ($\beta$-ethoxy-$\beta$-ethoxyethoxy)-acetyl chloride: 10 gm. of ($\beta$-ethoxy-$\beta$-ethoxyethoxy)-acetic acid were introduced into 20 cc. of thionyl chloride and the resulting solution was allowed to stand overnight at room temperature. The excess thionyl chloride was removed under reduced pressure and the residual liquid was rectified under vacuum. The fraction distilling at 106–108° C. under vacuum of 3 mm. Hg was recovered, and after a second rectification of the same type. 6.5 gm. of ($\beta$-ethoxy-$\beta$-ethoxyethoxy)-acetyl chloride having a boiling point of 108° C. at 3 mm. Hg and a specific rotation of $n_D^{20} = 1.4440$ were obtained. The product was colorless and soluble in chloroform.

Analysis.—Calc'd for $C_8H_{15}O_4Cl$ (percent): C, 45.61; H, 7.18; Cl, 16.83. Found (percent): C, 45.9; H, 7.20; Cl, 17. Molecular weight=210.6.

This compound is not described in the literature.

Step C.—Preparation of the 21-($\beta$-ethoxy-$\beta$-ethoxyethoxy)-acetate of 9$\alpha$-fluoro-16$\alpha$-methyl-$\Delta^{1,4}$-pregnadiene-11$\beta$,17$\alpha$,21-triol-3,20-dione: At a temperature of 0° C., 10.3 gm. of 9$\alpha$-fluoro-16$\alpha$ - methyl-$\Delta^{1,4}$-pregnadiene-11$\beta$,17$\alpha$,21-triol-3,20-dione were introduced into 52 cc. of anhydrous pyridine. Then, a solution of 6.2 gm. of ($\beta$-ethoxy-$\beta$-ethoxyethoxy)-acetyl chloride in 25 cc. of chloroform was added and the reaction mixture was allowed to stand for 60 hours in the refrigerator. Then, a few drops of water were added to the reaction mixture which agitated and then poured into water. The organic phase was decanted and the aqueous phase was extracted with chloroform. The organic phases were combined, successively washed with water, with 5 N hydrochloric acid and again with water, then with a sodium bicarbonate solution and finally with water until the wash waters were neutral. The residual oil was dried, concentrated under vacuum and taken up in methylene chloride. The solution obtained was subjected to chromatography through alumina with elution with methylene chloride. The eluate was concentrated to dryness and the residual oil was dissolved in 30 cc. of ethyl acetate. 135 cc. of ether were added to the solution and the crystallization was started and the crystallizing solution was left standing overnight at room temperature. Thereafter, the solution was vacuum filtered and the residue was dried under vacuum to obtain 8.5 gm. of 21-($\beta$-ethoxy-$\beta$-ethoxyethoxy) acetate of 9$\alpha$ - fluoro-16$\alpha$-methyl-$\Delta^{1,4}$-pregnadiene-11$\beta$,17$\alpha$-21-triol-3,20-dione having a melting point of 119° C. and a specific rotation $[\alpha]_D^{20} = +72.8° \pm 1°$ (c.=1% in dioxane);

The product occurred in the form of colorless prisms which were insoluble in water and ether and soluble in alcohol, acetone, benzene and chloroform.

Analysis.—Calc'd for $C_{30}H_{43}FO_9$ (percent): C, 63.58; H, 7.65; F, 3.35. Found (percent): C, 63.7; H, 7.6; F, 3.6. Molecular weight=566.64.

This compound is not described in the literature.

EXAMPLE II

Preparation of the 21-($\beta$-ethoxy-$\beta$-ethoxyethoxy) acetate of prednisolone Using the procedure of Example I, prednisolone was reacted with ($\beta$-ethoxy-$\beta$-ethoxyethoxy)-acetyl chloride to obtain the 21-($\beta$-ethoxy-$\beta$-ethoxyethoxy) acetate of prednisolone having a melting point of 142° C. and a specific rotation of $[\alpha]_D^{20} = +94°$ (c.=1% in dioxane). The product occurred in the form of colorless prisms which were soluble in alcohol, acetone, benzene and chloroform and insoluble in water and ether.

The product is not described in the literature.

EXAMPLE III

Preparation of the 21-($\beta$-ethoxy-ethoxy) acetate of 9$\alpha$-fluoro - 16$\alpha$ - methyl-$\Delta^{1,4}$-pregnadiene-11$\beta$,17$\alpha$,21-triol-3,20-dione Step A.—Preparation of ($\beta$-ethoxy-ethoxy) acetic acid: 17.25 gm. of sodium were added to 125 cc. of monoethyl ether of ethyleneglycol and the mixture was heated to an internal temperature of 100–110° C. until the sodium was entirely dissolved. After cooling the solution, 300 cc. of anhydrous benzene were added thereto and then 100 gm. of potassium monochloroacetate were introduced in small fractions over a period of ½ hour, and the reaction mixture was heated at reflux for 3 hours under vigorous agitation. Then the reaction mixture was cooled; water was added and the mixture was acidified by addition of concentrated hydrochloric acid. The benzene phase was decanted and the aqueous phase was extracted with benzene. The organic phases were combined, dried and concentrated under vacuum to a small volume. Then the residual liquid was rectified under vacuum and the fraction distilling at 120–127° C. under a vuccum of 3 mm. Hg was recovered to obtain 32.3 gm. of ($\beta$-ethoxy-ethoxy) acetic acid. [See Palomaa et al., Ber. 63, 3117 (1930).] This product was used as such for the next step of the preparation.

The liquid was colorless and was soluble in water and in most of the common organic solvents.

Step B.—Preparation og ($\beta$-ethoxy-ethoxy) actyl chloride; 14 gm. of ($\beta$-ethoxy-ethoxy)acetic acid, prepared as described in Step A, were introduced into 28 cc. of thionyl chloride and the resulting solution was allowed to stand overnight at room temperature. Then the excess thionyl chloride was removed under reduced pressure and the residual liquid was rectified under vacuum to recover a fraction distilling at 85–87° C. under a vacuum of 14 mm. Hg. After a second rectification of the same type, 11.2 gm. of ($\beta$-ethoxy-ethoxy) acetyl chloride having a boiling point of 91–93° C. at 20 mm. Hg and a specific rotation of $n_D^{20} = 1.4360$ were obtained.

The product obtained was colorless and was soluble in ether, benzene and chloroform.

Analysis.—Calc'd for $C_6H_{11}CO_3$ (percent) C, 43.25; H, 6.66; Cl, 21..28. Found (percent): C, 43.4; H, 6.7; Cl, 21.3. Molecular weight=166.61.

This compound is not described in the literature.

Step C.—Preparation of the 21-($\beta$-ethoxy-ethoxy) acetate of 9$\alpha$-fluoro-16$\alpha$-methyl-$\Delta^{1,4}$-pregnadiene-11$\beta$,17$\alpha$,21-triol-3,20-dione: At a temperature of 0° C., 10 gm. of 9$\alpha$-fluoro-16$\alpha$-methyl-$\Delta^{1,4}$-pregnadiene-11$\beta$,17$\alpha$,21 - triol-3,20-dione were introduced into 50 cc. of anhydrous pyridine. Then, a solution of 4.7 gm. of ($\beta$-ethoxy-ethoxy) acetyl chloride in 20 cc. of anhydrous chloroform were added dropwise thereto. The reaction mixture was allowed to stand overnight under refrigeration. Thereafter, a few drops of water were added to the reaction mixture which was agitated and poured into water. The chloroform layer was decanted and the aqueous layer was extracted with chloroform. The organic phases were combined and successively washed with water, with 5 N hydrochloric acid, again with water, then with a sodium bicarbonate solution and once more with water until the wash waters were neutral. The organic phase was dried and concentrated under vacuum to a low volume and the residue was taken up in methylene chloride. The solution obtained was subjected to chromatography through alumina and eluted with methylene chloride. The solvent was removed under vacuum and the residue was recrystallized from hot benzene to obtain 9 gm. of 21-($\beta$-ethoxy-ethoxy) acetate of 9$\alpha$ - fluoro - 16$\alpha$ - methyl - $\Delta^{1,4}$ - pregnadiene-11$\beta$,17$\alpha$,21-triol-3,20-dione having a melting point of 172° C. and a specific rotation $[\alpha]_D^{20} = -80.2°$ (c.=0.5% in dioxane).

The product occurred in the form of colorless crystals which were insoluble in water, in dilute aqueous acids and alkalis, slightly soluble in ether and benzene and soluble in alcohol and chloroform.

Analysis.—Calculated for $C_{28}H_{39}FO_8$ (percent): C, 64.35; H, 7.52; F, 3.64. Found (percent): C, 64.6; H, 7.6; F, 3.7. Molecular weight=522.59.

This compound is not described in the literature.

Pharamacological study of the 21-($\beta$-ethoxy-$\beta$-ethoxyethoxy) acetate of 9$\alpha$-fluoro-16$\alpha$-methyl - $\Delta^{1,4}$ - pregnadiene-11$\beta$,17$\alpha$,21-triol-3,20-dione (A) Transcutaneous action on rats determined by the thymolytic effect.—The thymolytic effect in the rat was determined after cutaneous application of the product used under study in the form of 0.25% (concentration expressed in percent of dexamethasone).

Male rats weighing 160–170 gm. each were depilated in the cervical region under anesthesia with ether on the day prior to the experiment. They received two applications per day of the ointment containing the said compound for 2 days, the ointment being applied by massaging the depilated area with the ointment for about 30 seconds. The rats were sacrificed on the third day and the thymus glands were removed and weighed.

This treatment corresponded with the administration of 45 $\mu$g. of active compound per kg. of body weight per application (dose expressed in dexamethasone). A decrease in weight of the thymus glands of about 50% was ascertained by comparison with the weight of the thymus glands as determined in the control rats. The result showed satisfactory cutaneous penetration of the said product.

(B) Clinical tests.—The said product was prepared in the following ointments which were used in the clinical tests.

Ointment A:

| | Grams |
|---|---|
| Active product | 0.25 |
| Propyleneglycol | 26.8 |
| Carbowax 300 | 14.65 |
| Polyoxyethylene sorbitan mono-oleate | 0.42 |
| Liquid petrolatum | 2.38 |
| Carbowax 1540 | 22.60 |
| Carbowax 4000 | 11.30 |
| Vaseline | 10.50 |
| Cholesterol | 0.70 |
| Zinc stearate | 5.90 |
| Water | 4.50 |

Ointment B:

| | |
|---|---|
| Active product | 0.25 |
| Liquid petrolatum | 6.0 |
| Vaseline | 93.75 |

Ointment C:

| | |
|---|---|
| Active product | 0.25 |
| Liquid petrolatum | 30.0 |
| Lanolin | 2.0 |
| White wax | 8.0 |
| Clarcel 83 | 4.0 |
| Polyoxyethylene sorbitan mono-stearate | 1.0 |
| Mercuric phenyl nitrate | 0.002 |
| Water—sufficient quantity | 100.0 |

Carbowax 300, Carbowax 1540 and Carbowax 4000 are polyethylene glycols whose molecular weights vary from 200 to 7000 and Clarcel 83 is a commercial diatomaceous earth.

CASE HISTORY 1

Patient, female, age 40, suffering from psoriasis with large patches scattered over the entire body of eczematous and pruriginous character, responding poorly to the customary local therapeutics for psoriasis (tar, cignolin) which consisted of applications of corticoid ointments with and without occlusion.

Ointment B was applied in the morning and at night on the left leg for 8 days. This treatment was very well tolerated and effected a good action on the pruritus as well as on the psoriasis.

CASE HISTORY 2

Female patient, age 57, suffering from eczema affecting hands and arms resulting from a medicinal intolerance (sensitization with local medications applied to an ulcer of the leg). The patient was treated with comparative applications of Ointments A and B on the upper limbs and with applications of Ointment C on the left leg.

Ointment B used on the left arm (80% improvement within 8 days) showed adequate efficacy on the pruritus and on the lesions. The other Ointments A and C were slightly less efficacious with the erythema, the pruritus and the vesicles persisting here and there.

CASE HISTORY 3

Hairdresser, age 52, suffering from acute dermatitis of the face, arms and hands, this ailment having started 8 years ago and having spread ever since. Positive tests were made with para-phenylenediamine, with a permanent hair wave liquid, with rubber gloves and with an antihistaminic, the application of which brought on a photosensitiveness.

The patient was treated first with comparative applications of Ointment A (right arm) and Ointment B (left arm), and with applications of Ointment C on face and lower neck. The three ointments proved to be well tolerated and of an approximately identical efficacy, although Ointment C was a slightly more drying character.

CASE HISTORY 4

Male patient, age 74, suffering from a fungoid mycosis which appeared a year ago. At the time the patient was admitted at the clinic, the lesions had become generalized over the entire body and the intolerable intense itching caused complete insomnia for the previous month.

Among other treatments, internal and local, comparative applications of Ointment A on the right arm, of Ointment B on the left arm and of Ointment C on the main body were employed. The said ointments effected an action on the pruritus and on the lesions and it was not possible to determine any distinct difference in action between the said three ointments.

CASE HISTORY 5

Male patient, age 54, suffering from a diathesic eczema, the attacks of which in Paris alternated with asthma attacks (in the country).

During a short period of hospitalization in January, the patient was treated with comparative applications of Ointments A and B. The two ointments proved efficacious with regard to the intense itching as well as to the eczema. The patient got relief within 9 days. No distinct difference was noted between the two ointments. Perhaps the epidermis had become slightly softer and less keratosic on the left side (Ointment B).

CASE HISTORY 6

Female patient, age 79, suffering from a microbic dermatitis on the right leg surrounding three varicose ulcers. Comparative applications were effected with Ointments A and B. The first was applied to the upper area of the afflicted part, the second to the lower area. A distinct difference in action was observed between the two ointments. Ointment B showed a distinctly greater efficacy and Ointment A caused a very significant lamellar desquamation.

CASE HISTORY 7

Male patient, age 52, was hospitalized for a generalized eczema, having started at the level of the anus, following a sensitization from the use of suppositories and from an ointment used for hemorrhoids (positive tests with Peruvian balm and with neomycin). At the time of his admission to the clinic, the lesions were generalized and particularly intense about the arms, hands, face and thighs.

The patient was treated with comparative applications of Ointments A and B on the arms and of Ointment C on the left thigh. At first, the patient complained of a tingling sensation at the time when Ointment B was applied. but after several days of treatment, this ointment showed more efficacy than the other two, although all three ointments were well tolerated and sufficiently efficacious.

CASE HISTORY 8

Female patient suffering for 3½ years from a varicose ulcer on the right leg. For 3 months the spreading of the lesions about the limbs and then over the entire body was noted. The lesions, in particular, were lichenified and super-infected about the limbs.

The patient was first treated with compresses of permanganate, then with comparative applications of Ointments A and B on the arms and of Ointment C on the entire body. The tolerance of the three ointments was very satisfactory and their efficacy was nearly identical.

CASE HISTORY 9

Female patient hospitalized for an onset of generalized eczema developed since March 1962. At this time the patient had sustained a burn which was treated with multiple ointments causing an eczema (positive tests with biocidan, penicillin and others). The eczema was treated with comparative applications of Ointments A and B on the arms, while a cream containing dexamethasone acetate was applied to the body and on the lower limbs. These different ointments were well tolerated and active in nearly identical manner. They effected a complete healing within 15 days.

CASE HISTORY 10

Female patient hospitalized in the clinic for a pemphigus having started 4 months ago on about the mucous membrane of the mouth. Actually the vesicles were small, but numerous about the chest and the abdominal surface.

For several days Ointment B was applied to this area. It was well tolerated. The lesions healed progressively within 15 days, but the curative action was very probably due to the general action of the cortisonics.

CASE HISTORY 11

Female patient, age 74, suffering from eczema on hands and knees. Eczema was recurrent at the location itself where the patient had shown a medicinal polymorphic erythema.

Comparative applications of Ointments A and B were advised. These two ointments were well tolerated and proved to be efficacious. It seemed that the healing was slightly more rapid on the left side where Ointment B had been applied.

Various modifications of the compositions and method of the invention may be made without departing from the spirit or scope thereof and it is to be understood that the invention is to be limited as defined in the appended claims.

We claim:
1. Esters of pregnane-21-ols of the formula

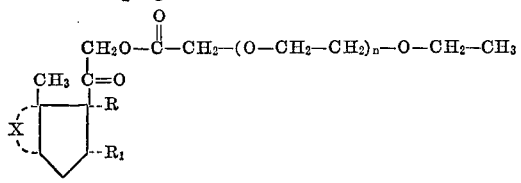

wherein R is selected from the group consisting of hydrogen, hydroxy and OAc, $R_1$ is selected from the group consisting of hydrogen and lower alkyl, Ac is the acyl radical of an organic carboxylic acid having 1 to 7 carbon atoms, $n$ is an integer from 1 to 2 and X represents the A, B and C rings of a pregnane steroid selected from the group consisting of

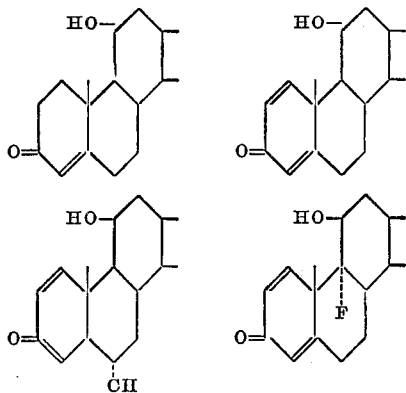

2. A compound of claim 1 which is the 21-($\beta$-ethoxy-$\beta$-ethoxy-ethoxy) acetate of 9$\alpha$-fluoro-16$\alpha$-methyl-$\Delta^{1,4}$-pregnadiene-11$\beta$,17$\alpha$,21-triol-3,20-dione.

3. A compound of claim 1 which is the 21-($\beta$-ethoxy-ethoxy) acetate of 9$\alpha$-fluoro-16$\alpha$-methyl - $\Delta^{1,4}$ - pregnadiene-11$\beta$,17$\alpha$,21-triol-3,20-dione.

4. A compound of claim 1 which is the 21-($\beta$-ethoxy-$\beta$-ethoxy-ethoxy) acetate of prednisolone.

References Cited

UNITED STATES PATENTS 2,876,263  3/1959  Mark _____ 260—573

FOREIGN PATENTS 1,156,075  10/1963  Germany _____ 260—397.45

OTHER REFERENCES

Palomaa et al.: Ber. Deut. Chem. Ges. 63, pp. 3117–3120 (1930).

Sulzberger et al.: J.A.M.A. 151, pp. 468–472 (1953) (pp. 470–471 relied on).

The Merick Index, 7th Ed., Rahway, N.J., Merck & Co., 1960, pages 532 and 533.

New Drugs, 1965 Ed., Chicago Ill., American Medical Association, 1965, pages 320–323.

LEWIS GOTTS, Primary Examiner

E. G. LOVE, Assistant Examiner

U.S. Cl. X.R.

424—243

PO-1050
(5/69)

UNITED STATES PATENT OFFICE
CERTIFICATE OF CORRECTION

Patent No. 3,546,261            Dated December 8, 1970

Inventor(s) ANDRE ALLAIS and MICHEL PATURET

It is certified that error appears in the above-identified patent and that said Letters Patent are hereby corrected as shown below:

After line 11 of column 1, insert

Claims priority, application France, November 4, 1964, 993,810 and France, July 9, 1965, 24154

Column 1, line 68

"apperance" should be "appearance"

Column 2, line 46

"predisone" chould be "prednisone"

Column 3, line 27

"homonal" chould be "hormonal"

Column 4, line 48 insert " was" between "which" and "agitated"

Column 5, line 42

"og" should be "of"

PO-1050
(5/69)

UNITED STATES PATENT OFFICE
CERTIFICATE OF CORRECTION

Patent No. 3,546,261     Dated December 8, 1970

Inventor(s) ANDRE ALLAIS and MICHEL PATURET

It is certified that error appears in the above-identified patent and that said Letters Patent are hereby corrected as shown below:

Column 5, line 56

"$C_6H_{11}CO_3$" should be "$C_6H_{11}ClO_3$"

Column 9, lines 25 to 32, correct the left hand partial formula to read as follows:

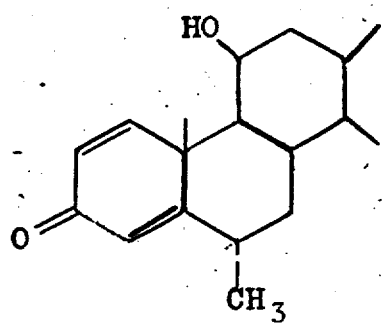

Signed and sealed this 21st day of December 1971.

(SEAL)
Attest:

EDWARD M. FLETCHER, JR.
Attesting Officer

ROBERT GOTTSCHALK
Acting Commissioner of Patents